US009875622B2

(12) United States Patent
Ventura

(10) Patent No.: US 9,875,622 B2
(45) **Date of Patent: *Jan. 23, 2018**

(54) METHOD AND DEVICE FOR CONDUCTING A CARD GAME

(71) Applicant: AGS LLC, Las Vegas, NV (US)

(72) Inventor: Ofir Ventura, Las Vegas, NV (US)

(73) Assignee: AGS LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,739

(22) Filed: Jan. 18, 2017

(65) Prior Publication Data

US 2017/0124811 A1 May 4, 2017

Related U.S. Application Data

(63) Continuation of application No. 13/633,364, filed on Oct. 2, 2012, now Pat. No. 9,564,011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***A63F 1/00*** | (2006.01) |

(52) U.S. Cl.

CPC ............ *G07F 17/3293* (2013.01); *A63F 1/00* (2013.01); *G07F 17/3258* (2013.01); *G07F 17/3262* (2013.01); *A63F 2001/001* (2013.01)

(58) Field of Classification Search

CPC ......................... G07F 17/3293; G07F 17/3262

See application file for complete search history.

(56) References Cited

U.S. PATENT DOCUMENTS

| | | | | |
|---|---|---|---|---|
| 5,362,064 A * | 11/1994 | Lofink | A63F 3/00157 | 273/274 |
| 5,851,010 A * | 12/1998 | Feinberg | A63F 11/00 | 273/138.1 |
| 6,345,824 B1 * | 2/2002 | Selitzky | A63F 3/00157 | 273/274 |
| 6,789,801 B2 * | 9/2004 | Snow | A63F 3/00157 | 273/146 |
| 8,317,584 B2 * | 11/2012 | Aoki | G07F 17/32 | 463/11 |

(Continued)

*Primary Examiner* — Milap Shah
*Assistant Examiner* — Jason Pinheiro
(74) *Attorney, Agent, or Firm* — Weide & Miller, Ltd.

(57) ABSTRACT

Game wagers are received on a hand. At least two hands are dealt and completed according to an underlying game of baccarat or baccarat variation. A bonus wager is received. After the hands are completed, a determination is made whether an end-bonus condition is met. If not, a determination is made whether a bonus-eligible sum has been obtained in a designated hand. Bonus-eligible hand sums may include designated hand sums in a player hand, a banker hand, a player hand or banker hand, and/or a player hand and banker hand. Bonus-eligible hand sums may also be hand sums closer to a target value in a designated hand. When bonus-eligible sums have been obtained in a threshold quantity of bonus triggering games, without obtaining an end-bonus condition, an award is issued on the bonus wager.

10 Claims, 2 Drawing Sheets

(56) References Cited

U.S. PATENT DOCUMENTS

| | | | | |
|---|---|---|---|---|
| 2004/0116179 | A1* | 6/2004 | Nicely | A63F 3/00157 463/25 |
| 2006/0014577 | A1* | 1/2006 | Snow | G07F 17/32 463/12 |
| 2007/0135193 | A1* | 6/2007 | Nicely | A63F 1/00 463/11 |

* cited by examiner

METHOD AND DEVICE FOR CONDUCTING A CARD GAME

RELATED APPLICATION DATA

This application is a continuation of U.S. patent application Ser. No. 13/633,364, filed Oct. 2, 2012. The present application claims priority to said prior application and incorporates by reference said prior application as if set forth fully herein.

FIELD OF THE INVENTION

The present invention relates to wagering games. More specifically, the present invention is a method for conducting a card game in which players designate a hand and players wagering on the winning hand are rewarded including a wagering proposition which is carried over multiple iterations of the card game.

BACKGROUND OF THE INVENTION

A well known casino game is Baccarat. Baccarat is a live table game that uses a standard deck of fifty-two playing cards. The object of Baccarat is for a player to successfully wager on which of two hands, designated the Banker hand and the Player hand, is going to win. The player is paid even money for the wager if he or she wagers on the winning hand and loses the wager if he or she selects the losing hand.

Play of Baccarat is commenced after all wagers are made by dealing two cards to the Bank position and two cards are dealt from the shoe to the Player position on the table layout. The cards are turned face up and the values of the Banker hand and the Player hand is determined by summing the face values of the cards in each hand. If the values of the cards are added together and the total of the hand exceeds nine, then the hand value is determined modulo ten. In other words, all hand values range from a low of zero to a high of nine. For example, a seven and an eight total fifteen, but the hand value is five. An Ace and a nine total ten, but the hand value is zero. Whichever of the Banker hand or the Player hand is closest to a total of nine is the winner.

Depending on the hand score of the initial Player hand and the initial Banker hand, one more card may be dealt to the Player hand, the Banker hand or both. If either or both of the initial two card Player hand and the initial Banker hand have a hand score of 8 or 9, the wagers are resolved without dealing any additional cards: the Player hand wins if the Player hand score is greater than the Banker hand score; and the Banker hand wins if the Banker hand score is greater than the Player hand score. If both the Player hand and Banker hand have a hand score that is less than 8, a third card may be dealt to one or both of the Player hand and/or Banker hand. The rules for determining whether a third card is dealt are fixed; that is, there is no discretion for either the Player hand or the Banker hand on whether a third card is dealt.

Rule #1: If the initial two card Player hand has a hand score of 0, 1, 2, 3, 4, or 5, the Player hand draws a third card. If the initial two card Player hand has a hand score of 6 or 7, the Player hand stands and does not receive a third card.

Rule #2: If the Player hand stands and does not draw a third card, then the Banker hand follows Rule # 1. In other words, if the Player hand has a hand score of 6 or 7, the Banker hand draws a third card on a hand score of O, 1, 2, 3, 4, or 5 and the Banker hand stands on a hand score of 6 or 7.

Rule #3: If the Player hand draws a third card, the Banker hand must draw or stand as follows:

| Banker hand two card hand score: | Banker hand DRAWS when Player's hand third card is: | Banker hand STANDS when Player's hand third card is: |
|---|---|---|
| 0, 1, or 2 | Banker always draws | |
| 3 | 0, 1, 2, 3, 4, 5, 6, 7, or 9 | 8 |
| 4 | 2, 3, 4, 5, 6, or 7 | 0, 1, 8, or 9 |
| 5 | 4, 5, 6, or 7 | 0, 1, 2, 3, 8, or 9 |
| 6 | 6 or 7 | 0, 1, 2, 3, 4, 5, 8, or 9 |
| 7 | | |

At the end of each hand, winning wagers are paid and losing wagers are collected by the house. Any commission due to the house is marked in commission boxes in the center of the table.

As may be appreciated, one limitation of Baccarat is the lack of wagering options and low payouts. As noted above, winning wagers on a Player hand are paid at even money, while winning wagers on a Banker hand are paid at even money less a commission. It can be seen, therefore, that there is a need in the art for a modification to Baccarat which allows more betting options and provides the flexibility to issue awards greater than standard Baccarat awards, at the discretion of the operator. Additionally, all the wagers in Baccarat are resolved in a single game. Thus, it can be seen that there is a need for methods for conducting Baccarat games that reward a player for continuing play of the Baccarat over multiple games.

SUMMARY OF THE INVENTION

The present invention includes a method and device for conducting a card game. In an optional embodiment, the card game may be conducted at a physical gaming table using playing cards for at least one player. In one optional embodiment, a set of draw rules is defined. In one such optional embodiment, the defined draw rules are the same as those used in conventional baccarat described above. In alternate optional embodiments, the draw rules may be modified, replaced, or otherwise changed.

At least one bonus-eligible sum is defined. In an optional embodiment, a bonus-eligible sum may be a designated hand score in (a) the Player hand, (b) the Banker hand, (c) the Player hand or Banker hand, and/or (d) the Player hand and the Banker hand. In another optional embodiment, the bonus-eligible sum may be any hand score in a designated one of the player hand and/or the banker hand that is closer to a target value. For example, in one such optional embodiment, the bonus-eligible sum may be any winning hand score in a designated hand. A threshold quantity of bonus triggering games greater than or equal to one is also defined. The threshold quantity of bonus triggering games is the quantity of games in which a bonus-eligible sum is obtained that are required to trigger a bonus. An end-bonus condition is likewise defined. As above, the end-bonus condition may be a designated hand score in (a) the player hand, (b) the banker hand, (c) the player hand or banker hand, and/or (d) the player hand and the banker hand.

A bonus wager is received. As may be appreciated, the bonus wager is received in addition to any base game wagers. The bonus wager may be optional or mandatory, depending on the optional embodiment.

A series of games is conducted. Each game includes receiving a game wager on either a banker hand or a player hand. At least a banker hand and a player hand of playing cards are dealt. A hand score is calculated for each of the banker hand and the player hand as the sum modulo ten of the values of the playing cards in that hand.

The hand scores of the banker hand and the player hand are compared to a target value. The banker hand and player hand are completed by standing or dealing additional playing cards to the banker hand and the player hand according to the draw rules. The hand score of the player hand is compared to the hand score of the banker hand and the target value and wagers are rewarded on the hand having a hand score closer to the target value. In an optional embodiment, wagers on both the banker hand and player hand are returned if said hand scores are equal.

The hand scores of at least one of the player hand and the banker hand are compared to the end-bonus condition. When the end-bonus condition is fulfilled, bonus wagers are collected. When the end-bonus condition is not fulfilled, the hand scores of at least one of the player hand and the banker hand are compared to the at least one bonus-eligible sum.

An award based on the bonus wager is issued only when a bonus-eligible sum has been obtained within the series of games, in a quantity of games at least equal the threshold quantity of bonus triggering games, without obtaining an end-bonus condition within the series of games.

In a further optional embodiment, the present invention includes a method conducted on a gaming device, and a gaming device. In one such optional embodiment, a gaming device includes a data processor in communication with a display, a player interface, and a memory device. The memory device is configured to store program instructions for executing a method according to an embodiment of the present invention. In one such optional embodiment, a method includes storing a set of draw rules at the memory device. Additionally, at least one bonus-eligible sum, a threshold quantity of bonus triggering games greater than or equal to one, and an end-bonus condition are stored at the memory device. As above, the bonus-eligible sum may be a designated hand score in (a) the Player hand, (b) the Banker hand, (c) the Player hand or Banker hand, and/or (d) the Player hand and the Banker hand. Similarly, an end-bonus condition may be a designated hand score in (a) the Player hand, (b) the Banker hand, (c) the Player hand or Banker hand, and/or (d) the Player hand and the Banker hand.

A bonus wager is received through the player interface. In an optional embodiment, the bonus wager may be mandatory or optional.

A series of games is conducted by the data processor. Each game within the series includes receiving a game wager on either a banker hand or a player hand through the player interface. The data processor deals at least a banker hand and a player hand of playing cards. The data processor calculates a hand score for each of the banker hand and the player hand as the sum modulo ten of the values of the playing cards in that hand. The data processor compares the hand scores of the banker hand and the player hand to a target value and completes the banker hand and player hand by standing or dealing additional playing cards to the banker hand and the player hand according to the draw rules stored at the memory device.

The data processor compares the hand score of the player hand to the hand score of the banker hand and the target value. The data processor rewards wagers on the hand having a hand score closer to the target value. Optionally, the data processor returns wagers on both the banker hand and the player hand if the hand scores are equal.

The data processor compares at least one of the hand scores of the player hand and the banker hand to the end-bonus condition. When the end-bonus condition is fulfilled, the data processor collects the bonus wager. When the end-bonus condition is not fulfilled, the data processor compares the hand scores of at least one of the player hand and the banker hand to the at least one bonus-eligible sum. An award is issued by the data processor based on the bonus wager only when a bonus-eligible sum has been obtained within the series of games, in a quantity of games at least equal the threshold quantity of bonus triggering games, without obtaining an end-bonus condition within the series of games.

DETAILED DESCRIPTION OF THE INVENTION

Figure 1:
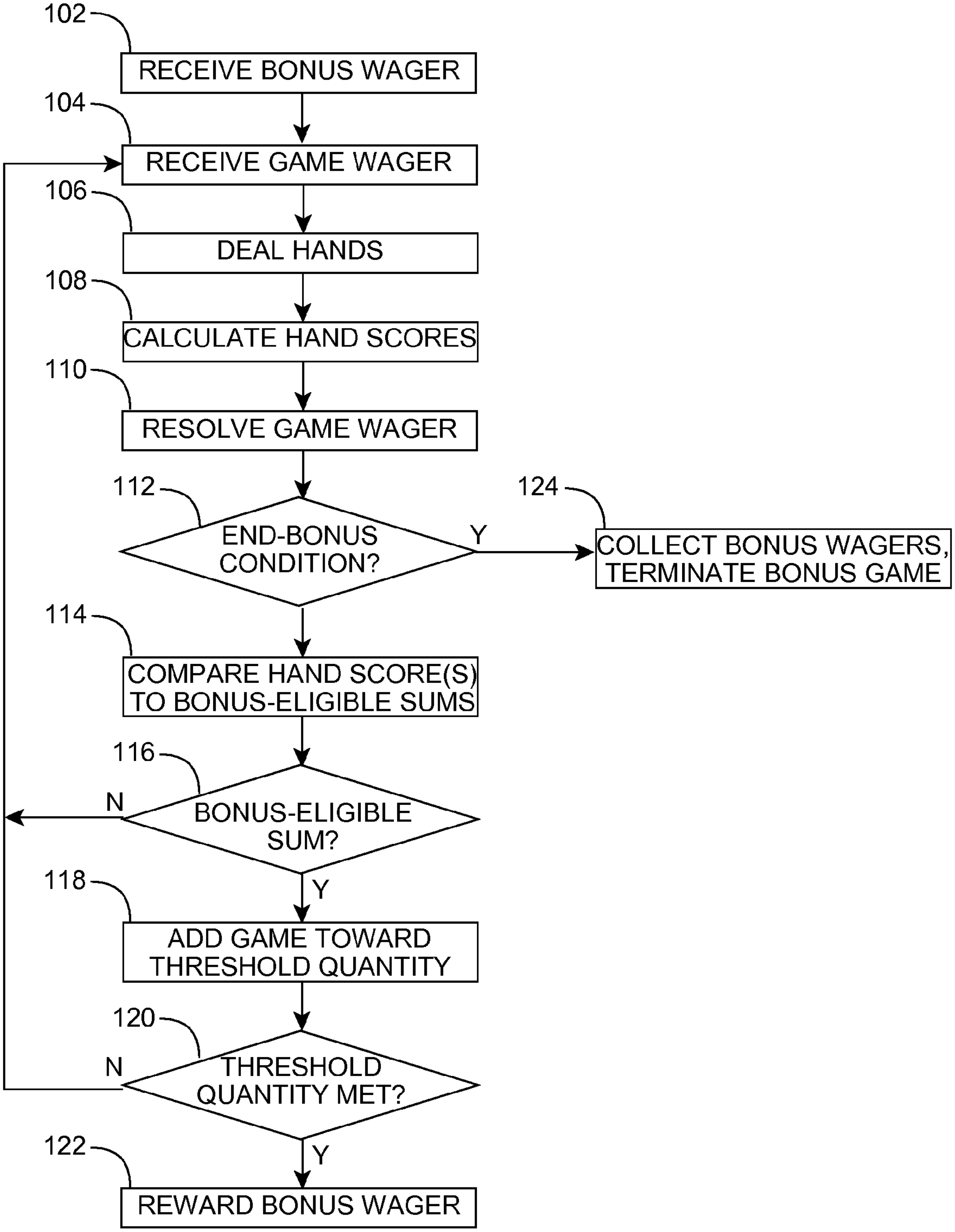
FIG. 1 is a flowchart of a method according to an embodiment of the present invention.
Figure 2:
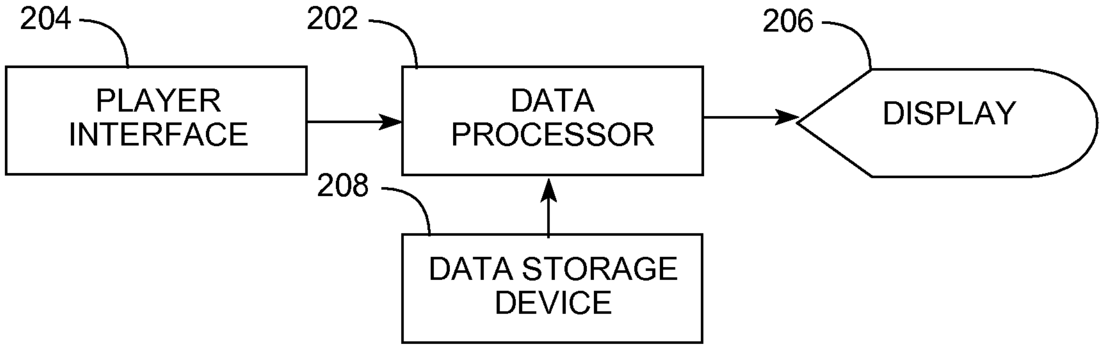
FIG. 2 is a block diagram of a device according to an embodiment of the present invention.

Reference is now made to the figures wherein like parts are referred to by like numerals throughout. Referring generally to FIGS. 1-2, the present invention is directed to a method for conducting a wagering game, particularly a card game. In this regard, a method according to the present invention could be conducted using conventional playing cards, that is, playing cards having a rank of two through ten, Jack, Queen, King, or Ace in four different suits, or customized playing cards. Similarly, the present game could be conducted using one or more decks of conventional fifty-two card constitution, one or more supplemented decks (for example, decks including additional playing cards such as Jokers), one or more truncated decks (for example, Spanish decks lacking playing cards typically found in conventional decks), or the like. Moreover, the present invention may be conducting using a device. A device may take any form, including a personal computer (whether networked or standalone), tablet device, mobile phone, PDA, interactive television, video gaming machine, mechanical gaming machine, kiosk, or the like. In an optional embodiment illustrated in FIG. 2, the device includes a data processor 202 in communication with a display 204, a data storage device 206, and a player interface 208. The data storage device 206 may take any form, including magnetic, optical, Flash, or other memory, and is configured to store graphics, sounds, parameters for conducting the game method, and the like. The data storage device 206 also stores program instructions executable by the data processor 202 to conduct a game according to an embodiment of the present invention.

Referring to FIG. 1, the present method includes a game conducted for one or more players. A game according to the present invention could be house-banked, i.e., the wagers are collected and paid by a game operator, or player-banked, i.e., the wagers are collected and paid by a player-banker. In an optional embodiment in which the game is player-banked, the role of player-banker may be fixed or rotate among players.

In an optional embodiment, the method may be applied to a conventional baccarat game. Alternatively, the present method may be applied to variations on baccarat, or baccarat-type games, such as the various no-commission baccarat games or the like.

In one optional embodiment, the base baccarat game includes receiving 104 a game wager from a player along with a designation of a hand on which the game wager is placed. For example, in one optional embodiment, two hands may be dealt, a "player hand" and a "banker hand," and the game wager is received from a player along with a designation whether the game wager is on the "player hand" or the "banker hand." It is noted that the conventional distinction between the player hand and banker hand are the draw rules applied to the hands, which leads to a commission typically charged on winning bets on the banker hand. It is noted that the present invention may be applied to any baccarat or baccarat-type game, without regard to the specific draw rules, or the inclusion or exclusion of a commission. In this regard, the present invention is an improvement or modification of the base game, regardless of the exact nature of the base game.

It is also noted that while the examples given below are directed to an embodiment in which two hands, a player hand and a banker hand, are wagered upon and conducted, any number of hands may be wagered upon and conducted in other optional embodiments. In an optional embodiment, a player may be presented with wagering options in addition to those specifically described in this disclosure, such as receiving an election to wager on a tie between hands or a pair appearing in a hand. Such optional or mandatory side wagers may be included in the base baccarat or baccarat-type game independent of the operation of the present method.

The hands are dealt 106. In an optional embodiment, the hands may be designated a banker hand and a player hand, although it is contemplated that any name or identification could be used to identify the hands. The hands may include any quantity of playing cards; in an optional embodiment, each hand includes two playing cards. It is contemplated that the hands may be community hands that are shared among players wagering on those hands in a manner similar to conventional baccarat. In an alternate optional embodiment, each player may receive a separate hand to wager on against a banker hand, similar to chemin de fer or other variations.

A hand score is calculated for each hand by taking the sum modulo ten of the values of the playing cards in the hand. In an optional embodiment using conventional playing cards, the two through nine playing cards have a value equal to their face value, the Ace playing card has a value of one, and the ten, Jack, Queen, and King playing cards have a value of zero. As may be appreciated, the sum modulo ten means that if the sum exceeds ten, only the ones digit is used, with the tens digit disregarded. For example, the hand score for a hand of 8<) 5\7 is three (e.g., thirteen modulo ten equals three). In such an optional embodiment, the target value, i.e., the goal for forming a hand, is a hand score of nine.

The hands are completed and hand scores are calculated 108 for each hand. Game wagers are resolved 110 as in the underlying baccarat or baccarat-type game. For example, in an optional embodiment, one or more natural hand scores may be defined. There may be any quantity of natural hand scores and the natural hand scores may take any value. In such an optional embodiment, a natural hand score occurs when a predefined sum modulo ten is obtained in the initial cards dealt to a hand. For example, in one optional embodiment, eight and nine are defined as natural hand scores. In such an optional embodiment, a hand of, for example, 4♠ 5♥ (hand score of 9), 9♣ 9♥ (hand score of eight), 8♦K♣ (hand score of eight), 9♠ J♠ (hand score of nine), and 8♥ A♦ (hand score of nine), would all have natural hand scores.

If a hand has a natural hand score, the hand always stands. Draw rules are defined for the hands that do not include natural hand scores. In an optional embodiment based on conventional baccarat, conventional draw rules may be used. In conventional baccarat, the player hand draws if the initial two-card player hand has a hand score of 0, 1, 2, 3, 4, or 5. Conversely, the player hand stands, and does not draw, if the initial two-card player hand has a hand score of 6 or 7. If the player hand stands and does not draw a third card, then the banker hand draws on hand scores of 0, 1, 2, 3, 4, or 5, and stands on hand scores of 6, or 7. Conversely, if the player hand draws, the banker hand draws based on the initial two-card point value of the banker hand and the third card of the player hand, i.e., the value of the card drawn to the player hand. Table 1 summarizes the draw rules when the player hand draws.

TABLE 1

| Banker hand two-card hand score: | Banker hand DRAWS when Player's hand third card is: | Banker hand STANDS when Player's hand third card is: |
|---|---|---|
| 0, 1, or 2 | Bank always draws | |
| 3 | 0, 1, 2, 3, 4, 5, 6, 7, or 9 | 8 |
| 4 | 2, 3, 4, 5, 6, or 7 | 0, 1, 8, or 9 |
| 5 | 4, 5, 6, or 7 | 0, 1, 2, 3, 8, or 9 |
| 6 | 6 or 7 | 0, 1, 2, 3, 4, 5, 8, or 9 |
| 7 | | Banker always stands |

In an optional embodiment of an underlying baccarat or baccarat-type game, the hands are examined for natural hand scores. If only one of the hands obtains a natural hand score, that hand wins; wagers on the hand with a natural hand score are rewarded and wagers on the other hand(s) not having a natural hand score are collected. For example, if a player hand is dealt 8♣ K♥ and a banker hand is dealt 5♦ 9♠, the player hand of 8♣ K♥ wins with a natural hand score of eight. Wagers on the player hand would be rewarded and wagers on the banker hand would be collected.

In an optional embodiment of an underlying baccarat or baccarat-type game, if more than one hand obtains a natural hand score, but the natural hand scores are unequal, the natural hand scores may be ranked so that the hands can be differentiated. Thus, in one such optional embodiment, a rule may be adopted in which the hand with the greater natural hand score wins; in such an optional embodiment, wagers on the hand with the higher ranking natural hand score are rewarded and wagers on the hand with the lower ranking natural hand score are collected. In one optional embodiment, the natural hand scores are ranked according to their proximity to the target value. Thus, in an optional embodiment in which nine is the target value, a natural hand score of nine may be ranked higher than a natural hand score of eight. For example, if a player hand is dealt 8♣ K♥ and a banker hand is dealt 5♦ 4♠, both hands have a natural hand score, but the banker hand of 5♦ 4♠ wins with a natural hand score of nine against the player hand's natural hand score of eight. In an example where the natural hand score of nine outranks the natural hand score of eight, wagers on the banker hand would be rewarded and wagers on the player hand would be collected. As may be appreciated, this is merely an example and the natural hand scores may be ranked in any order.

Optionally, if more than one hand has a natural hand score and the natural hand scores are equal, a tie may occur. In an optional embodiment, the wagers on the banker hand and player hand may push, i.e., be returned, in the event of a tie.

Alternatively, all ties, or certain ties, may be player-winning outcomes, banker-winning outcomes, automatically losing outcomes regardless of which hand is wagered on, or the like.

If neither hand has a natural hand score, the draw rules are applied and the hand scores are compared. If the hand scores of the player hand and banker hand are equal, a tie occurs. In an optional embodiment, the wagers on the banker hand and player hand may push, i.e., be returned, in the event of a tie. Alternatively, all ties, or certain ties, may be player-winning outcomes, banker-winning outcomes, automatically losing outcomes regardless of which hand is wagered on, or the like.

If the hand scores are unequal, the hand scores are compared and the hand having a hand score closer to the target value is deemed the winning hand. In an optional embodiment using a target value of nine in which hand sums are calculated using modulo-ten arithmetic, such as conventional baccarat, the greater hand score will be closer to the target value than the lesser hand score.

Game wagers may be rewarded in any manner. In an optional embodiment, game wagers are rewarded at even money without a commission. In an alternate optional embodiment, rewards may be assessed a commission. In one optional embodiment, the commission amount is a fixed amount, optionally expressed as a percentage of the reward. For example, in one such optional embodiment, a commission of 5% may be assessed on all rewards for wagers on a winning banker hand. It is contemplated, however, that the present method could be applied to any baccarat or baccarat-type game, regardless of the method of paying winning bets, including the various no-commission baccarat games known in the art.

With continued reference to FIGS. 1 and 2, a bonus wager is received 102 at the commencement of a game. As will become clear below, a bonus wager according to an embodiment of the present invention persists over multiple games and is either rewarded when a certain quantity of bonus-eligible sums are obtained within the multiple games or lost when an end-bonus condition occurs. It is contemplated that a bonus wager may be received in any game, or rules may be defined for when a bonus wager may be received. For example, in an optional embodiment, a bonus wager may only be received at the beginning of a series of games, e.g., in a game immediately after an end-bonus condition has occurred. In an alternate optional embodiment, a bonus wager may be received in any game, regardless of whether the series has already commenced. In yet a further optional embodiment, a bonus wager may be received in any game, including the first game, in a series of games, but only if no bonus-eligible sums had been obtained in the series prior to receipt of the bonus wager.

In an optional embodiment, bonus wagers may be separately defined for the player hand and the banker hand. That is, in one optional embodiment, there may exist a separate banker hand bonus wager and player hand bonus wager. As described in greater detail below, a banker hand bonus wager may be fulfilled or ended by hand scores in the banker hand, while a player hand bonus wager may be fulfilled or ended by hand scores in the player hand. In an optional embodiment, bonus wagers may be offered for both the banker hand and player hand, and players may be permitted to wager on both the banker hand and player hand or players may be limited to wagering on only one of the banker hand or the player hand, depending on the optional embodiment.

Alternatively, a bonus wager may be offered on only one of the banker hand or player hand. That is, in such an optional embodiment, an election of (a) a banker hand bonus wager, (b) a player hand bonus wager, or (c) both may not be available as only one bonus wager is offered.

In yet another optional embodiment, a single bonus wager may be offered, but it may be fulfilled by either the player hand or the banker hand. That is, in such an optional embodiment, the bonus wager is received on, and is paid for, hand scores coming from either the player hand or the banker hand.

The hand scores of the player hand and banker hand will be compared 114 to a defined set of bonus-eligible sums. In one optional embodiment, the set could include multiple bonus-eligible sums. For example, the set of bonus-eligible sums could include the sums five, six, seven, eight, and nine. In another optional embodiment, the set could include a single bonus-eligible sum. In yet a further optional embodiment, the set could include any winning sum, i.e., any sum that outranks the hand score of the opposing hand in the specific game. In such an optional embodiment, the bonus-eligible sums would include any sum from two through nine, as long as it was greater than the hand score of the banker hand in that game.

Additionally, a threshold quantity of bonus triggering games is defined. This threshold quantity is the quantity of games in which a bonus-eligible sum must be obtained, before an end-bonus condition occurs, to trigger the bonus. In an optional embodiment, the threshold quantity is one per bonus-eligible sum. Thus, in one such example, the set of bonus-eligible sums includes the hand scores five, six, seven, eight, and nine, and the threshold quantity is one each of the hand scores in the set of bonus-eligible sums. It is contemplated that obtaining repeated hand scores may have no effect, insofar as no additional "credit" is given for obtaining a hand score in the set of bonus-eligible sums multiple times, but neither would a player be penalized for obtaining a hand score in the set of bonus-eligible sums multiple times. In an alternate optional embodiment, it may be required that the bonus-eligible sum(s) be obtained multiple times before an end-bonus condition occurs. For example, the set of bonus-eligible sums could include the hand score of seven, and the threshold quantity is three, meaning that the bonus is triggered if the hand score of seven is obtained three times. In a further optional embodiment, the threshold quantity may act as a minimum, with additional "repeats" being added to the count. In one such optional embodiment, the payout for the bonus wager may be calculated, at least in part, on the quantity of games counted. For example, in an optional embodiment in which bonus-eligible sums include any winning hand score, a threshold quantity may be five, so that five winning hand scores triggers a bonus, but more than five winning hand scores are also eligible for a bonus pay out, with the pay out calculated based on the quantity winning hand scores obtained before the end-bonus condition occurs.

The hand in which the hand score must be obtained, may, as described above, vary depending on the optional embodiment. In one optional embodiment, the hand score must be obtained in the hand(s) selected for wager. Thus, if a player hand bonus wager is received, only hand scores from the player hand are counted toward the threshold quantity. If a banker hand bonus wager is received, only hand scores from the banker hand are counted toward the threshold quantity. If both a player hand bonus wager is received and a banker hand bonus wager is received, both hand scores accrue toward the threshold quantity, but separate counts are maintained for each threshold quantity. Thus, either or both bonus wagers may be rewarded, but for fulfilling different criteria from different hands, e.g., the player hand for the player hand bonus wager and the banker hand for the banker hand bonus wager.

An end-bonus condition is defined. In an optional embodiment, an end-bonus condition is a hand score. As above, the hand score could be in the player hand, banker hand, both the player hand and banker hand, or either the player hand or the banker hand. For example, in one optional embodiment, separate a separate player hand bonus wager and banker hand bonus wager may be offered and an end-bonus condition may be a hand score of four in the player hand or the banker hand. Thus, in such an optional embodiment, the banker hand bonus wager may end upon a hand score of four in either the banker hand or player hand. Similarly, the player hand bonus wager may end upon a hand score of four in either the banker hand or player hand. In an alternate optional embodiment, a bonus wager may end only when the hand wagered upon fulfills an end-bonus condition. Thus, in an example of such an optional embodiment, a player hand bonus wager may end when a hand score of four is obtained in the player hand, but a banker hand bonus wager may continue. In yet another variation, an end-bonus condition may require both hands to obtain a specified hand score either separately or simultaneously.

In each game, a determination is made 112 whether an end-bonus condition has been fulfilled. If the end-bonus condition has been fulfilled, bonus wagers are collected and the bonus for the preceding series of games is terminated 124. As discussed above, the end-bonus condition could also signal the beginning of a new bonus wagering series and eligibility to place new bonus wagers.

Only when the end-bonus condition is not fulfilled is a determination made 116 whether a bonus eligible sum has been obtained (and obtained in the correct hand, in certain embodiments). If a bonus-eligible sum has been obtained, the game is added 118 toward the threshold quantity. Likewise, a determination is made 120 whether the bonus-eligible sum(s) was/were obtained in the threshold quantity of bonus triggering games. If the threshold quantity of bonus triggering games has not been met, the series of base games continues until the threshold quantity of bonus triggering game is met (in which case the bonus wagers are rewarded 122) or the end-bonus condition occurs and the bonus is terminated 124.

Bonus wagers may be rewarded in any manner. For example, as discussed above, pay outs for bonus wagers may be based on the quantity of games in which the bonus-eligible sums were obtained. Alternatively, pay outs for bonus wagers may be fixed. For example, in one optional embodiment, a player hand bonus wager and a banker hand bonus wager may each be rewarded at twenty-five to one.

In an optional embodiment, the present method may be conducted using a device. The device may take any form, including a personal computer, tablet, mobile phone, handheld device, PDA, electronic gaming machine, electronic gaming table, mechanical gaming machine, kiosk, or the like. In one such optional embodiment illustrated in FIG. 2, a device includes a data processor 202 in communication with a player interface 204 and a display 206. The data processor 202 also communicates with a data storage device 208, which stores game parameters, graphics, sounds, if any, and program instructions executable by the data processor 202 to conduct a game according to an embodiment of the present invention.

For example, in one optional embodiment, a game wager is received from the player through a player interface 204. The player interface 204, for example, may include an input device, such as a touch screen, button panel, keyboard, keypad, pointer, mouse, or the like, that the player can operate to designate a wager. Additionally or alternatively, the player interface 204 may include a receiving device, such as a bill acceptor, ticket or voucher reader, coin receiver, or the like to receive payment for a wager and/or game credits usable for wagering. The player designates a hand to be wagered upon through the player interface 204 when placing the game wager. As noted above, in an optional embodiment two hands are provided, with the hands designated a player hand and a banker hand. Optionally, additional proposition wagers may be selectable by the player, such as a wager on a tie outcome, a pair occurring in one or both of the hands, or other optional proposition. Additionally, a bonus wager is received through the player interface 204. As noted above, multiple bonus wagers may be offered, in which case an election may be received through the player interface 204 of one bonus wager or multiple bonus wagers.

The data processor 202 deals the hands, optionally by randomly dealing cards from a deck stored at the data storage device 208. The data processor 202 displays the hands at a display 206 and completes the hands according to the method described above. For example, in an optional embodiment, the hand score of each hand is calculated by the data processor 202. If either hand has a natural hand score, the game ends with the hand having the natural hand score closer to the target value winning.

If neither hand has a natural hand score the draw rules are applied and the hands are completed. Game wagers are resolved in accordance with the base game, optionally baccarat or a baccarat-type base game.

Bonus wagers are resolved by the data processor 202 comparing the hand scores of the player hand and/or banker hand to an end-bonus condition. If an end-bonus condition has occurred, the game is terminated and the bonus wagers are retained by the device.

If an end-bonus condition has not occurred, the hand scores of the player hand and/or banker hand are compared by the data processor 202 to the bonus-eligible sums. If a bonus-eligible sum has been obtained according to the conditions of the bonus wager received, the game is counted toward the threshold quantity of bonus triggering games. If not, the count is not incremented. When the threshold quantity of bonus triggering games is met within a series of games without an end-bonus condition, a bonus is triggered and an award is issued based on the bonus wager.

Awards for winning game wagers and bonus wagers may be added to a register of game credits stored in the device. Additionally or alternatively, the player interface 204 may include a dispensing device to dispense currency, coins, a ticket or voucher, or the like, representing the player's balance of stored game credits when the player desires to cash out.

While certain embodiments of the present invention have been shown and described it is to be understood that the present invention is subject to many modifications and changes without departing from the spirit and scope of the invention presented herein.

What is claimed is:

1. A method of conducting a card game at an electronic gaming table comprising at least one player interface, the method comprising:

providing a set of draw rules;

determining at least one bonus-eligible sum, a bonus threshold quantity, and an end-bonus condition;

receiving a bonus wager comprising receiving at least one physical item of value via said at least one player interface;

conducting a series of games by the data processor, each game within said series comprising:

receiving a game wager comprising receiving at least one physical item of value via said at least one player interface, the game wager designating either a banker hand or a player hand for resolution of the game wager;

dealing physical playing cards from one or more decks of physical playing cards to the banker hand and the player hand, each playing card having a defined value;

calculating a hand score for each of the banker hand and the player hand as the sum modulo ten of the values of the playing cards in that hand;

comparing the calculated hand score of the banker hand and the player hand to a target value and standing or dealing additional playing cards to the banker hand and the player hand according to the draw rules;

recalculating hand scores of the banker hand and the player hand including any additional playing cards dealt and comparing the recalculated hand score of the player hand to the recalculated hand score of the banker hand and to the target value;

resolving the game wager based on the banker hand or the player hand having the recalculated hand score closer to the target value;

comparing at least one of the recalculated hand score of the player hand and the banker hand to the end-bonus condition, and when the end-bonus condition is satisfied, collecting the bonus wager and terminating the series of games; and comparing the recalculated hand score of at least one of the player hand and the banker hand to the at least one bonus-eligible sum, when the at least one bonus-eligible sum is achieved, increasing a tracked number of bonus-triggering games, and when the at least one bonus-eligible sum is not achieved, continuing the series of games unless the end-bonus condition is triggered; and issuing an award on the bonus wager when the tracked number of bonus-triggering games equals the bonus threshold quantity without obtaining the end-bonus condition within the series of games, the bonus threshold quantity being set to at least two.

2. The method of claim 1, wherein the bonus-eligible sum is a designated hand score of the player hand.

3. The method of claim 1, wherein the bonus-eligible sum is a designated hand score of the banker hand.

4. The method of claim 1, wherein the bonus-eligible sum is a designated hand score of either the player hand or the banker hand.

5. The method of claim 1, wherein the bonus-eligible sum is a designated hand score of both the player hand and the banker hand.

6. The method of claim 1, wherein the bonus-eligible sum is any hand score in the designated one of the player hand and the banker hand that is closer to the target value.

7. The method of claim 1, wherein the end-bonus condition is a designated hand score of the player hand.

8. The method of claim 1, wherein the end-bonus condition is a designated hand score of the banker hand.

9. The method of claim 1, wherein the end-bonus condition is a designated hand score of either the player hand or the banker hand.

10. The method of claim 1, wherein the end-bonus condition is a designated hand score in both said player hand and said banker hand.

* * * * *